UNITED STATES PATENT OFFICE.

FRANK W. YEAGER, OF GRANTWOOD, NEW JERSEY, ASSIGNOR TO THE BARRETT COMPANY, A CORPORATION OF NEW JERSEY.

PAINT AND METHOD OF MAKING THE SAME.

1,355,102.  Specification of Letters Patent.  Patented Oct. 5, 1920.

No Drawing.  Application filed July 8, 1919. Serial No. 309,289.

*To all whom it may concern:*

Be it known that I, FRANK W. YEAGER, a citizen of the United States, residing at Grantwood, in the county of Bergen and State of New Jersey, have invented certain new and useful Improvements in Paint and Methods of Making the Same, of which the following is a specification.

This invention relates to a paint made from tar pitch, and the method of producing the same.

Tar paints and lacquers have been produced and used in large quantities for many years on account of their valuable insulating and waterproofing properties and their resistance to the action of the weather and chemicals. Many variatioins in composition of these paints have been placed upon the market, ranging from mere dehydrated tars at one extreme to solutions of moderately high melting point pitches in refined solvents at the other.

Such tar paints that fall in the first class, that is, dehydrated tars, have obvious disadvantages, the most notable being their variable composition and properties.

Paints made from a uniform base and a uniform solvent do not possess these disadvantages; therefore the use of a pitch base is preferred. Pitches can be controlled as to their melting point by carrying the distillation to the proper extent. They are not readily susceptible to chemical influence and do not rapidly deteriorate or change in character, so that the most satisfactory paints of this sort can be made from this class of bitumen.

Paints have been made by dissolving these pitches in suitable solvents such as crude coal tar solvents or naphthas. These paints possess more desirable properties than those obtained from tars but the use of crude solvents is undesirable because these crude solvents usually have decidedly unpleasant odors which make their use disagreeable during application and hence unpleasant to the workman. When such pitches are dissolved in refined or "washed" solvents which have been substantially freed from those materials, such as certain unsaturated bodies and sulfur compounds, etc., which impart a disagreeable odor a paint is produced which has highly desirable properties as far as odor is concerned. It has, however, been found that such solvents tend to precipitate an insoluble body from the solution which produces a dull coat when the paint is applied. The term "washed" or refined solvent is intended to include distillates obtained from tars, and condensates obtained in the manufacture of illuminating gas, that have been refined by a treatment which removes their objectionable odors, by destroying, extracting or polymerizing such odoriferous constituents, so that the refined or "washed" solvent is of a light color and not unpleasant odor.

By this invention paints are produced which possess the desired characteristics, are homogeneous, and do not have a tendency to precipitate insoluble bodies. This is done by dissolving pitch in a "washed" solvent to which has been added a small amount of so-called "tar-acids," say about one to three per cent. by volume of the finished paint. It is obvious that the "tar-acids" may be added to the pitch solution after the pitch has been dissolved in the solvent. It has been found, however, that the condition affording the best result is that of the addition of the "tar-acid" to the solvent before dissolving the base, for, in the case of the addition of "tar acids" after the mixing of the base and solvent the time of agitation for producing a homogeneous solution is increased. For the purposes of this invention it has been found that a large number of the "tar acids" are suitable, but the most desirable ones are those which volatilize readily so that they tend to evaporate and do not remain a long time in the film of paint when it has been applied. This is especially advantageous if the paint is to be used where alkaline conditions exist, as the acids will evaporate before a great amount of chemical reactions have taken place with the alkali.

While the high boiling "tar acids" consisting largely of the higher homologues of phenol and cresol are beneficial and may be used in preventing precipitation of the insoluble body from the pitch solution, it is preferable to use the more volatile ones such as phenol (carbolic acid) or cresols (cresylic acid) or mixtures of the same since these compounds are quite volatile. The paint consisting of pitch dissolved in a solvent containing the "tar acid" may be applied in the usual way and is very effective in imparting insulating and waterproofing properties to the surfaces to which it is applied, while at the same time the paint will adhere closely to the surfaces with very little danger of peeling off, and is also highly resistant to the weather and chemical influences. The freedom from the presence of insoluble bodies and the homogeniety of the solution enables the paint to produce a glossy, continuous film when it is applied which is retained even after the more volatile constituents have evaporated.

Other materials, such as acetone, linseed oil, barium sulfate, Portland cement, manganese resinate, etc., may be mixed with the herein described composition for use as thinners, driers, fillers, etc., without affecting the intent and purpose of this invention.

In this specification the term "tars" is intended to include such tars as those obtained from retort gas, coke oven gas, producer gas, water gas, etc., and those resulting from the destructive distillation of coals in general. Pitches are the residua which remain after distilling off from tars the volatile constituents, and may vary widely in physical properties depending on the type of paint desired.

I claim:

1. The herein described process which comprises dissolving pitch in a solvent to which has been added about one to three per cent. by volume of "tar acids," on the basis of the finished paint.

2. A paint consisting of pitch, a solvent derived from coal tar which has been refined so as to be of a light color and free from objectionable odors, and a "tar acid."

3. A paint, containing pitch, a solvent derived from coal tar which has been refined so as to be of a light color and free from objectionable odors, and a "tar acid," said acid being about one to three per cent. by volume of said paint.

4. A paint, containing pitch, a solvent derived from coal tar which has been refined so as to be of a light color and free from objectionable odors, and a phenol, said phenol being about one to three per cent. by volume of said paint.

5. The herein described process of manufacturing a paint which comprises dissolving pitch in a solvent to which has been added about 1 to 3% by volume of a phenol, on the basis of the finished paint.

6. The herein described process of manufacturing a paint which comprises dissolving pitch in a solvent to which has been added about one to three per cent. by volume of cresylic acid, on the basis of the finished paint.

7. A paint, containing pitch, a solvent derived from coal tar which has been refined so as to be of a light color and free from objectionable odors, and cresylic acid, said cresylic acid being about one to three per cent. by volume of said paint.

In testimony whereof I affix my signature.

FRANK W. YEAGER.